United States Patent [19]
Erven et al.

[11] Patent Number: 6,143,254
[45] Date of Patent: Nov. 7, 2000

[54] EMISSIONS REDUCTION SYSTEM & METHOD THEREFOR

[76] Inventors: Roger Joyce Erven, 2630 E. Victor Hugo, Phoenix, Ariz. 85032; Gene J. Bemel, 5249 E. Shea Blvd., #111, Scottsdale, Ariz. 85254

[21] Appl. No.: 09/197,030

[22] Filed: Nov. 20, 1998

[51] Int. Cl.⁷ .......................... B01D 50/00; B01D 53/34; F01N 3/00
[52] U.S. Cl. .......................... 422/169; 422/168; 422/170
[58] Field of Search ...................................... 422/168, 169, 422/170–180; 55/DIG. 30; 181/258; 60/295, 299, 302

[56] References Cited

U.S. PATENT DOCUMENTS 3,445,196  5/1969  Thomas ..................................... 422/171
5,367,131  11/1994  Bemel ...................................... 181/232

*Primary Examiner*—Marian C. Knode
*Assistant Examiner*—Alexa A. Doroshenk
*Attorney, Agent, or Firm*—Jeffrey Weiss; Jeffrey D. Moy; Weiss & Moy, P.C.

[57] ABSTRACT

An emissions reduction system comprising an emission gas inlet for receiving emissions-containing gas, and an emissions reducing device for reducing emissions contained in the emissions-containing gas. The emissions reducing device is coupled at a first end thereof to the emission gas inlet and an emission gas outlet is coupled at a second end of the emissions reducing device for releasing emissions-reduced gas. The emissions reducing device comprises: a torturous fluid channel, lava material displaced within the torturous fluid channel wherein the lava material is located within a set of self contained containers within the emissions reducing device.

6 Claims, 2 Drawing Sheets

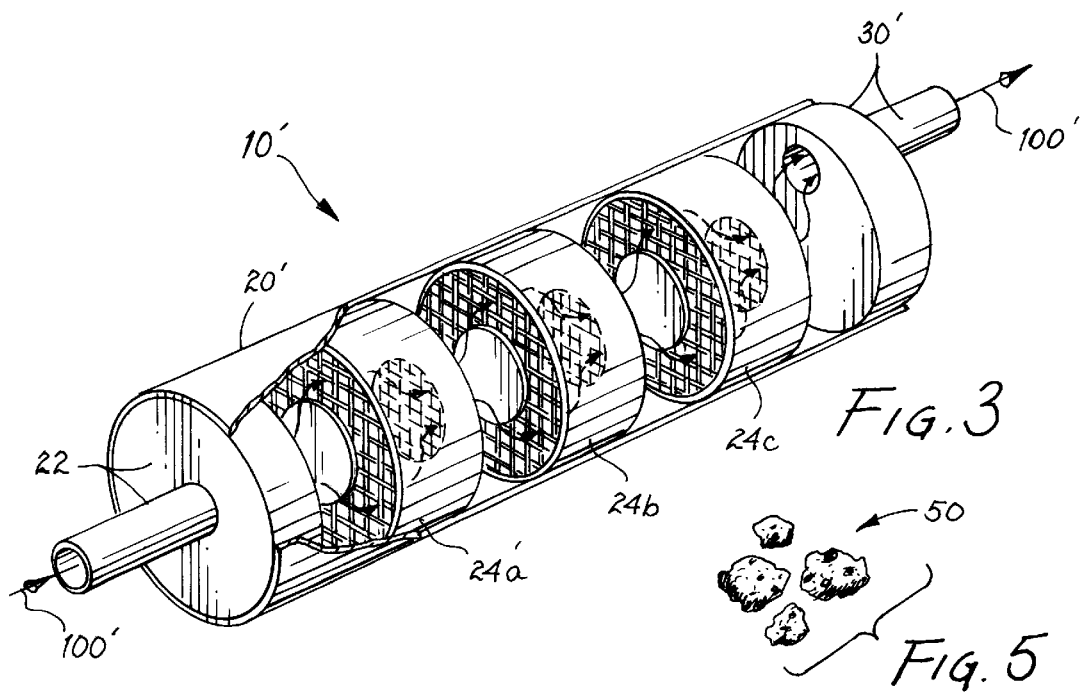
Fig. 3
Fig. 5
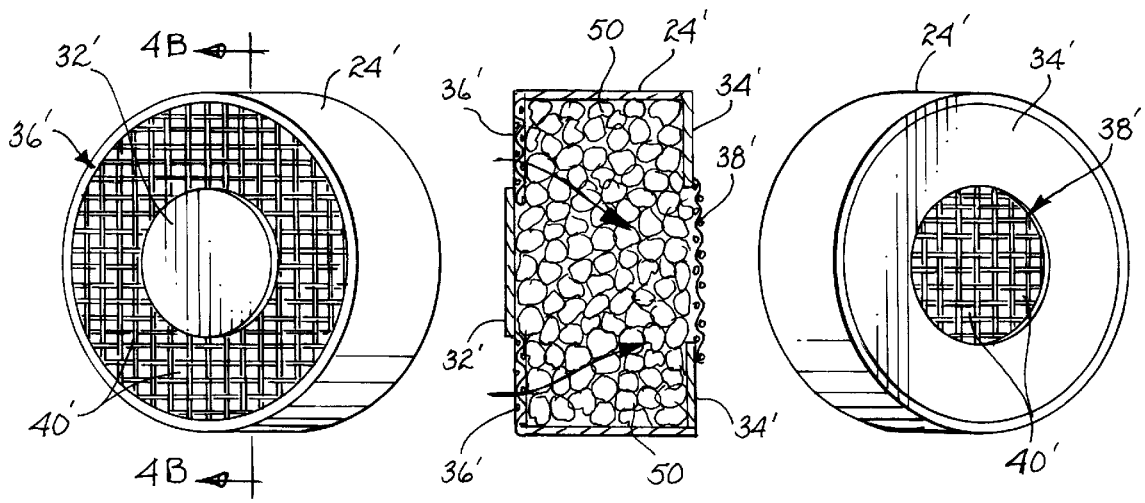
Fig. 4A  Fig. 4B  Fig. 4C

EMISSIONS REDUCTION SYSTEM & METHOD THEREFOR

BACKGROUND OF THE INVENTION

1. Field of the Invention

This invention is in the field of emissions reduction systems and methods therefor. More particularly, this invention is an emissions reduction system and method of utilizing material possessing characteristics substantially the same as lava rock to chemically convert emissions to non-pollutants, while muffling the exhaust system noise.

2. Description of the Related Art

The need to reduce emissions of pollution causing devices, particularly reducing oxides of nitrogen (NOx) emissions from diesel and gasoline engines, has been an ongoing problem since the days of coal burning fireplaces, and the use of coal burning, steam powered, automobiles. Additionally, a further need has been the reduction of exhaust system noise from the engine. These needs has been met over the years with a combination of approaches.

Addressing the pollution aspects, the fuels being burned have been improved using such techniques as the removal of lead from fuels, and the 1990 Clean Air Act Amendments have required oxygenated gasoline in areas that exceed the national ambient air-quality standard for carbon monoxide during the winter when the concentrations of carbon monoxide are highest. Additional improvements or solutions to exhaust system pollutants have been the addition of water injection systems to fuel systems, computer controls have allowed the development of lean-burn engines, and on a large scale, exhaust electrostatic scrubbers and filters have been added.

The exhaust system noise reduction problem has been typically addressed using baffle systems, or other types of baffling such as glass packs, with exhaust systems to reduce the exhaust noise volume.

All of these systems, those for emission control and for noise control, have their drawbacks however. The addition of water systems, powered scrubbers, etc. all require the addition of complex equipment. The addition of additives to fuels carries the problems of preventing the addition of yet another harmful chemical to the environment. Currently many states are addressing the problems of methyl tertiary butyl ether ("MTBE") additions to automobile gasoline. MTBE is a chemical blamed for water contamination in California and other states. Additionally, while lean-burn technology significantly lowers hydrocarbon (HC), carbon monoxide (CO) and NOx emissions, the after-treatment of NOx emissions becomes more difficult than with current gasoline engines. This problem is further exacerbated by the Federal Government's imminent implementation of Tier II standards for exhaust emission standards, which will call for even more stringent emissions standards. The severity of this problem is demonstrated by the high level of attention it has received. Recently, Vice President Gore awarded medals to a 37-member research team from eight different organizations across the U.S. in recognition of the researchers' teamwork and progress into emission control and prevention. The team, comprised of scientists and engineers from Chrysler, Ford and General Motors, and five of the federal government's national laboratories, has stated, in regard to their research, that "achieving Tier II's NOx requirement will be a challenge."

The standard, or conventional mufflers on the commercial market also have their problems. The quieter a muffler, in general, the more back pressure and the less efficient and weaker will be the engine it is muffling.

Therefor a need existed for an emissions reduction system and method that would both reduce pollution emissions and muffle exhaust noise without requiring complex equipment. Additionally, a need existed for an emissions reduction system and method using economical, natural materials that do not in themselves pollute the environment. A further need existed for an emissions reduction system and method that would function within very broad parameters, both in a hot running state or a cold startup state. Yet another need existed for an emissions reduction system and method capable of meeting the increased Tier II emissions guidelines. Additionally, a need existed for an emissions reduction system and method where the exhaust system device would have the low back pressure levels required for efficient engine operation.

SUMMARY OF THE INVENTION

An object of the present invention is to provide an emissions reduction system and method that would both reduce pollution emissions and muffle exhaust noise without requiring complex equipment.

Another object of the present invention is to provide an emissions reduction system and method using economical, natural materials that do not in themselves pollute the environment.

Yet a further object of the present invention is to provide an emissions reduction system and method that would function within very broad parameters, both in a hot running state or a cold startup state.

An additional object of the present invention is to provide an emissions reduction system and method capable of meeting the increased Tier II emissions guidelines.

An additional object of the present invention is to provide an emissions reduction system and method where the exhaust system device would have the low back pressure levels required for efficient engine operation.

BRIEF DESCRIPTION OF THE PREFERRED EMBODIMENTS

In accordance with one embodiment of the present invention, an emissions reduction system is disclosed. The emissions reduction system comprises; inlet means for receiving emissions-containing gas, emissions reducing means coupled at a first end thereof to the inlet means for reducing emissions contained in the emissions-containing gas and outlet means coupled at a second end of the emissions reducing means for -releasing emissions-reduced gas. The emissions reducing means comprises; a torturous fluid channel, lava material displaced within the torturous fluid channel wherein the lava material is located within a set of self contained containers within the emissions reducing means.

In accordance with another embodiment of the present invention, a method of reducing emissions in gases is disclosed. The method of reducing emissions in gases comprising the steps of, providing a compacted lava bed comprised of lava material, packing the lava material in the compacted lava bed to a design density having pre-selected particle size, pre-selected weight and pre-selected surface area ratio to produce a design differential pressure across the compacted lava bed under fluid flow conditions, and passing emissions-containing gas through the compacted lava bed.

In accordance with yet another embodiment of the present invention, an emissions reduction system is disclosed. The emissions reduction system comprises; inlet means for receiving emissions-containing gas, emissions reducing means coupled at a first end thereof to the inlet means for reducing emissions contained in the emissions-containing gas, and outlet means coupled at a second end of the emissions reducing means for releasing emissions-reduced gas. The emissions reducing means comprises; a torturous fluid channel, and lava material displaced within the torturous fluid channel. The inlet means, the outlet means, and the emissions reducing means are disposed so as to achieve a design differential pressure between the inlet means and the outlet means for reducing the emissions within the emissions-containing gas.

The foregoing and other objects, features, and advantages of the invention will be apparent from the following, more particular, description of the preferred embodiments of the invention, as illustrated in the accompanying drawings.

BRIEF DESCRIPTION OF THE DRAWING

FIG. 3. is a simplified functional diagram and perspective of a second embodiment of the present invention.

FIGS. 4 (a, b, c) are perspective and cut-away drawings of an alternate exemplary compaction cell shown in FIG. 3.

FIG. 5 is a perspective drawing of the lava material contained within the compaction cells shown in FIGS. 1–4.

DESCRIPTION OF THE PREFERRED EMBODIMENTS

A preferred embodiment of the Emissions Reduction System and Method has a two-fold purpose: 1) To reduce noise levels to a greater extent than generally used commercial muffler systems, and 2) to reduce the amount of harmful gas emissions produced by combustion engines well below the strictest standards set in the USA today, or by tomorrow's Tier II requirements.

The Emissions Reduction System and Method works equally well with a variety of fuels including, but not limited to, diesel, leaded and unleaded fuels.

Preferred Embodiment

Figure 1:
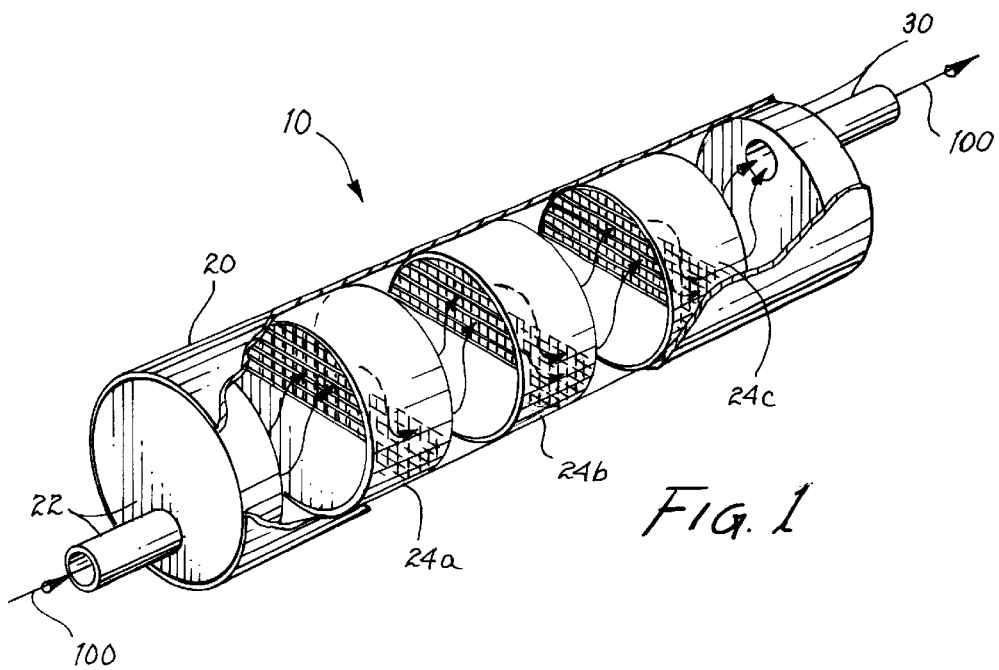
FIG. 1. is a simplified functional diagram and perspective of a preferred embodiment of the present invention.

Referring to FIG. 1, a simplified functional diagram and perspective of a preferred embodiment of the present invention, hereinafter the "system 10", is shown. The system 10 preferably comprises: an outer casing 20, a gas inlet end 22, a gas outlet end 30, and three compaction cells 24a, b, c. As can be seen in FIG. 1, the elements of the system 10 are coupled together to form an elongated tube. Emissions containing gas enters the system 10 through the gas inlet 22, flows through the three compaction cells 24a, b, c and flows out of the gas outlet end 30.

Referring to FIG. 2 perspective and cut-away drawings of an exemplary compaction cell as utilized in FIG. 1 is shown. It will be understood that each of the compaction cells 24a, b, c are identical and the following description of compaction cell 24 may be applied to all compaction cells 24a, b, c.

Figures 2A, 2B, 2C:
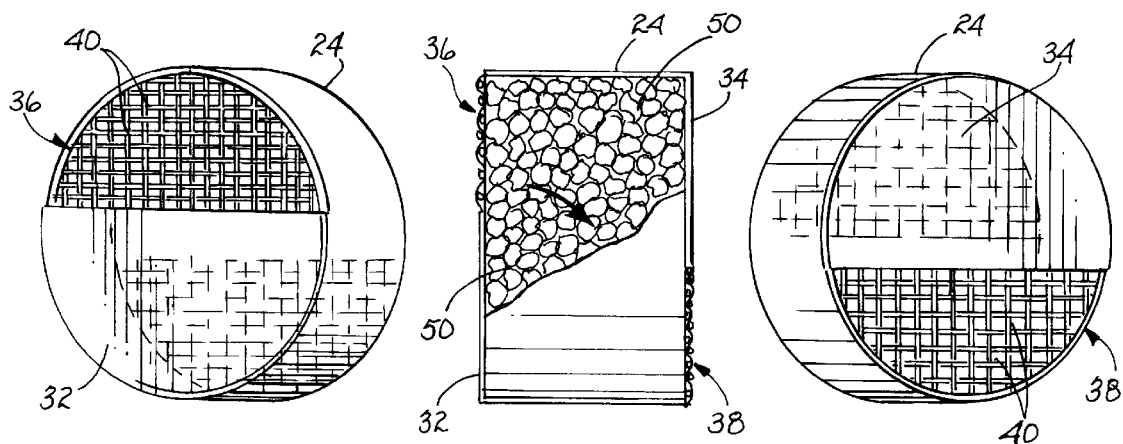
FIGS. 2 (a, b, c) are perspective and cut-away drawings of an exemplary compaction cell shown in FIG. 1.

In a preferred embodiment, a compaction cell 24 is a rounded device, bearing a likeness to the shape, if not the dimensions, of a hockey puck. However, rounded, as used herein, may comprise though not be limited to, cylindrical shapes, elliptical shapes, etc., with the only limitation being that the compaction cell 24 should substantially conform to the shape of the outer casing 20 wherein the outer casing 20 can have other than a cylindrical shape. Each compaction cell 24 has a gas inlet retention screen 36, a gas inlet side blank 32, a gas outlet retention screen 38, a gas outlet side blank 34, lava material 50, and lava material retention screen elements 40 coupled together to form a compaction cell 24. The lava material retention screen elements 40 are preferably made up of fibers coupled together to form a mesh screen having spacing such that the lava material 50 is retained within the compaction cell 24. Additionally, as is depicted in FIGS. 2a and 2c, each side of the compaction cell 24 preferably has the surface area of its inlet and outlet sides substantially equally split between the gas inlet retention screen 36 and the gas inlet side blank 32 on the inlet side, and substantially equally split between the gas outlet retention screen 38, and the gas outlet side blank 34 on the outlet side. Referring to FIG. 2b, a cut away shows the lava material 50 which is packed into each of the compaction cells 24a, b, c.

Referring back to FIG. 1, and thereon referring to torturous flow path indicator 100, it can be seen that the emissions containing gas is forced to follow a torturous flow path from the gas inlet end 22, through each of the compaction cells 24 a, b, c, and then out the gas outlet end 30. The torturous flow path is caused by the center axially displaced alignment between: the gas inlet end 22; through each of the compaction cells 24 a, b, c,'s gas inlet retention screen 36, through the lava material 50, through the gas outlet retention screen 38; and then out the gas outlet end 30. The torturous flow path insures that turbulent flow of the emissions containing gas occurs thereby resulting in the most surface contact between the emissions containing gas and the lava material 50.

Second Embodiment

Referring to FIG. 3, a simplified functional diagram and perspective of a second embodiment of the present invention, hereinafter the "system 10'", is shown. The system 10' preferably comprises: an outer casing 20', a gas inlet end 22', a gas outlet end 30', and three compaction cells 24'a, b, c. As can be seen in FIG. 3, the elements of the system 10' are coupled together to form an elongated tube. Emissions containing gas enters the system 10' through the gas inlet 22', flows through the three compaction cells 24'a, b, c and flows out of the gas outlet end 30'.

Referring to FIG. 4 perspective and cut-away drawings of an exemplary compaction cell as utilized in FIG. 3 is shown. It will be understood that each of the compaction cells 24'a, b, c are identical and the following description of compaction cell 24' may be applied to all compaction cells 24'a, b, c.

In a preferred embodiment, a compaction cell 24' is a rounded device, bearing a likeness to the shape, if not the dimensions, of a hockey puck. However, rounded, as used herein, may comprise though not be limited to, cylindrical shapes, elliptical shapes, etc., with the only limitation being that the compaction cell 24 should substantially conform to the shape of the outer casing 20 wherein the outer casing 20 can have other than a cylindrical shape. Each compaction cell 24' has a gas inlet retention screen 36', a gas inlet side blank 32', a gas outlet retention screen 38', a gas outlet side blank 34', lava material 50, and lava material retention screen elements 40' coupled together to form a compaction cell 24'. The lava material retention screen elements 40' are preferably made up of fibers coupled together to form a mesh screen having spacing such that the lava material 50 is retained within the compaction cell 24'. Additionally, as is depicted in FIGS. 4a and 4c, each side of the compaction cell 24' preferably has the surface area of its inlet and outlet sides substantially equally split between the gas inlet retention screen 36' and the gas inlet side blank 32' on the inlet side, and substantially equally split between the gas outlet retention screen 38', and the gas outlet side blank 34' on the outlet side. Referring to FIG. 4b, a cut away shows the lava material 50 which is packed into each of the compaction cells 24a, b, c.

Referring back to FIG. 3, and thereon referring to torturous flow path indicator 100', it can be seen that the emissions containing gas is forced to follow a torturous flow path from the gas inlet end 22', through each of the compaction cells 24'a, b, c, and then out the gas outlet end 30'. The torturous flow path is caused by the center axially displaced alignment between: the gas inlet end 22'; through each of the compaction cells 24'a, b, c,'s gas inlet retention screen 36', through the lava material 50, through the gas outlet retention screen 38'; and then out the gas outlet end 30'. The torturous flow path insures that turbulent flow of the emissions containing gas occurs thereby resulting in the most surface contact between the emissions containing gas and the lava material 50.

Lava Material Selection and Packing

The present invention uses a lava material having specific physical and chemical properties. A preferred location of lava material having the desired physical and chemical properties is Flagstaff Cinder Sales, Flagstaff Ariz. Other sources of suitable lava material possessing the physical and chemical properties of lava material from Flagstaff Cinder Sales may of course be utilized. These sources, as is well known in the art, could include other sellers of rock or lava material including mining operations, quarries etc. Additionally, artificially produced, or man made, material possessing substantially the physical and chemical properties of lava material from Flagstaff Cinder Sales may also be utilized in the present invention.

To produce the lava material 50 from the bulk material obtained from a lava material source the following method is followed:

1. Bulk material is selected from a lava material, or other suitable source, possessing substantially the chemical and physical properties of lava material from Flagstaff Cinder Sales. Typical lava material from the Flagstaff Cinder Sales has a chemical makeup substantially comprising at least the following Metal elements.

TABLE 1

Lava Material Metal Elements

| METAL | % BY WEIGHT | METAL | % BY WEIGHT |
|---|---|---|---|
| ALUMINUM | 1.7 | SODIUM | 0.3 |
| BARIUM | <0.00010 | STRONTIUM | <0.00050 |
| BORON | <0.00047 | TITANIUM | 0.1 |
| CALCIUM | 1.4 | VANADIUM | <0.00062 |
| CHROMIUM | <0.00010 | ZINC | <0.00031 |
| COBALT | <0.00011 | ANTIMONY | <0.00002 |
| COPPER | <0.00010 | ARSENIC | <0.00002 |
| IRON | 1.2 | CADMIUM | <0.00002 |
| MAGNESIUM | 1.6 | LEAD | <0.00001 |
| MANGANESE | <0.00030 | MOLYBDENUM | <0.00001 |
| NICKEL | <0.00010 | SELENIUM | <0.00005 |
| POTASSIUM | <0.0014 | SILVER | <0.00005 |

2. Bulk material is next subjected to a screening process. Screening preferably consists of placing the bulk lava material onto a screen table (not shown) having a selected size mesh spacing as shown in Table 2. Starting with Screen Step #1, the agitation of the screen table results in only the bulk material having dimensions smaller than the selected mesh spacing falling through the screen and being collected below. The screening process is then repeated for successively smaller mesh spacing as further listed in Table 2, Screen Steps #2, 3, and 4.

TABLE 2

Mesh Spacing for Screening Process

| PROCESS STEP | MESH SIZE |
|---|---|
| Screen Step #1 | ½" |
| Screen Step #2 | ⅜" |
| Screen Step #3 | ¼" |
| Screen Step #4 | 3/16" |

3. The screened bulk lava material is next sorted to select material having a substantially porous surface. Some lava material is possessed of a substantially smooth surface much as pea gravel or pebbles possess. This type of lava material is unsuitable and should be discarded. Screened bulk lava material having a substantially porous appearance however is retained. The screened porous lava material is next subjected to a void test in order to further select suitably porous lava material. A void test, as is well known in the art, is performed by placing a measured amount of the material to be tested, screened porous lava material in this case, into a container. The screened porous lava material will have a certain weight and gross volume. The container, of which the volume is known, is then filled with water and the weight and volume of the water added to the container is determined. This process will then allow a calculation, using a procedure, well known to those in the art, that will determine the void factor of the screened porous lava material. For example, in an exemplary test, the screened porous lava material weighed in at 42 oz, and the screened porous lava material volume, following the void test, showed a screened porous lava material volume of 49.48 cubic inches. In a second exemplary test, the screened porous lava material weighed in at 54 oz, and the screened porous lava material volume, following the void test, showed a screened porous lava material volume of 66.78 cubic inches. These two exemplary tests are used to select screened porous lava material having a weight to volume ratio of 1 :1.2 which will select suitable screened porous lava material 50. The object of a substantially 1:1.2 ratio is to ensure sufficient contact surface area between the lava material 50 and the emissions containing gas. The lava material 50 is next packed into an empty compaction cell 24. Lava material 50 is added to the compaction cell until full at substantially an 85% compaction factor. The substantially 85% compaction factor ensures that settling of the lava material within the compaction cell 24 will not occur, while also ensuring that excessive compaction will not occur thus resulting in pulverizing the lava material 50. Each of the compaction cells 24 is filled with lava material 50 processed using the above procedure.

The purpose of the above procedure is to ensure both sufficient contact surface area between the lava material 50 and the emissions containing gas, while also ensuring that the voids in the compaction cells 24 are of an adequate size to not excessively restrict the flow of the emissions containing gas and cause excessive back pressure thereto. The present invention is designed to maintain the back pressure below approximately one to two pounds per square inch for the systems 10 and 10'.

The actual back pressure of the system 10 and 10' may be tailored for specific applications by varying the above procedure using engineering methods well known to those in the art. For example, as just stated, internal combustion engines are designed to operate with maximum back pressures of substantially 1 PSI at 1000 RPM, and 2 PSI at 2000 RPM. However, different engines such as diesels, gas turbines, etc. will have different design back pressure specifications which a person well skilled in the art will be able to modify the present invention to satisfy.

Additionally, the above embodiments represent only two embodiments of the present invention. As is well know to those in the art, a wide range of compaction cell shapes, sizes and numbers thereof may achieve the method of the emissions reduction system of the present invention. As previously discussed, an important feature of the method is the correct selection and processing of the lava material 50 of the present invention. Using the previously defined lava material 50 selection method and packing the lava material 50 into appropriate canisters to the appropriate compaction factor, and with a correct emissions containing gas flow will result in the achievement of the present invention. Therefore, although the invention has been particularly shown and described with reference to a preferred and second embodiment thereof, it will be understood by those skilled in the art that changes in form and detail may be made therein without departing from the spirit and scope of the invention.

What is claimed is:

1. An emissions reduction system comprising, in combination:

inlet means for receiving emissions-containing gas;

emissions reducing means coupled at a first end thereof to said inlet means for reducing emissions contained in said emissions-containing gas;

said emissions reducing means comprising:
  a fluid channel;
  a set of self contained containers spaced apart from one another and located within said fluid channel;
  each of said self contained containers having an inlet side partially obstructed to the flow of said emissions-containing gas and an outlet side partially obstructed to the flow of said emissions-containing gas so as to force said emissions-containing gas to follow a torturous flow path when flowing from said inlet side to said outlet side;
  lava material displaced within said set of self contained containers;
  wherein said lava material comprises lava material having the following physical and chemical properties;:

| METAL | % BY WEIGHT | METAL | % BY WEIGHT |
|---|---|---|---|
| ALUMINUM | 1.7 | SODIUM | 0.3 |
| BARIUM | <0.00010 | STRONTIUM | <0.00050 |
| BORON | <0.00047 | TITANIUM | 0.1 |
| CALCIUM | 1.4 | VANADIUM | <0.00062 |
| CHROMIUM | <0.00010 | ZINC | <0.00031 |
| COBALT | <0.00011 | ANTIMONY | <0.00002 |
| COPPER | <0.00010 | ARSENIC | <0.00002 |
| IRON | 1.2 | CADMIUM | <0.00002 |
| MAGNESIUM | 1.6 | LEAD | <0.00001 |
| MANGANESE | <0.00030 | MOLYBDENUM | <0.00001 |
| NICKEL | <0.00010 | SELENIUM | <0.00005 |
| POTASSIUM | <0.0014 | SILVER | <0.00005 | and outlet means coupled at a second end of said emissions reducing means for releasing emissions-reduced gas.

2. The system of claim 1 wherein said lava material located within said sets of self contained containers is packed to a pre-selected loading having pre-selected mass and surface area ratios of said lava material.

3. The system of claim 2 wherein said pre-selected lava material has a screened particle size of substantially 3/16", has a weight to volume ratio of substantially 1:1.2, and is packed into said self contained containers to a compaction factor of substantially 85%.

4. The system of claim 3 wherein said set of self contained containers is a plurality of disc shaped containers.

5. The system of claim 4 wherein said plurality of disc shaped containers comprises at least three containers.

6. The system of claim 1 wherein the surface area of said inlet side is equally divided between a non-obstructed portion and an obstructed portion and wherein the surface area of said outlet side is equally divided between a non-obstructed portion and an obstructed portion.

* * * * *